United States Patent Office 3,448,200

Patented June 3, 1969

3,448,200

PROCESS FOR OBTAINING AN ANOREXIGENIC EFFECT

Willy G. Stoll, Bottmingen, Basel-Land, Switzerland, assignor to Geigy Chemical Corporation, Greenburgh, N.Y., a corporation of Delaware No Drawing. Filed Sept. 12, 1963, Ser. No. 308,344
Int. Cl. A61k 27/00
U.S. Cl. 424—329 3 Claims This invention relates to novel pharmaceutical compositions and methods of compounding and using the same. More particularly, the present invention pertains to novel and valuable anorexigenic compositions containing certain derivatives of cyclopentylbenzylamine and to a process for obtaining an anorexigenic effect in mammals by administering internally to them such cyclopentylbenzylamine derivatives.

Anorexigenic compositions are sometimes referred to as anorexic or anorectic compositions, appetite-satient or appetite-depressant or suppressant compositions, anti-appetite or anti-obesity compositions, or weight or appetite-control compositions and the like and are known in the art.

Briefly, the anorexigenic compositions and the process for achieving anorexigenic effects which form the objects of the instant invention employ as an active ingredient a cyclopentylbenzylamine derivative, as defined hereinbelow, and pharmaceutically acceptable acid addition and quaternary ammonium salts thereof dispersed in an oral or parenteral pharmaceutical carrier.

The cyclophenylbenzylamine derivatives may be represented by the following general formula:

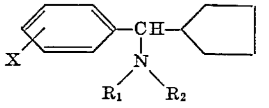

wherein:

$R_1$ and $R_2$ represent lower alkyl, particularly lower alkyl of 1–5 carbon atoms, and X stands for halogen, particularly, chlorine or bromine, substituted preferably meta or para to the cyclopentyl

—CH—
| moiety.

The above defined compounds can be prepared, for example, by reacting cyclohexene oxide with a Grignard reagent of a halogenated benzene, oxidizing the halogenated cyclopentylbenzyl alcohol obtained in the presence of potassium dichromate and a mineral acid or other conventional oxidizing agents to a halogenated phenylcyclopentyl ketone, and reductively aminating this ketone in the presence of formic acid with formamide to obtain a halogenated cyclopentylbenzylamine and finally alkylating the halogenated cyclopentylbenzylamine compound.

Alternatively, the halogenated phenylcyclopentyl ketone can be synthesized by starting with a halogenated benzaldehyde which gives a halogenated benzaldoxime when reacted with hydroxylamine hydrochloride in the presence of sodium bicarbonate. The aldoxime yields a halogenated benzonitrile upon refluxing in acetic anhydride. The halogenated phenylcyclopentyl ketone can be obtained by the addition of cyclopentyl magnesium bromide to the nitrile followed by hydrolysis. The ketone made by either method is reductively aminated to the intermediate amine by treatment with ammonia and hydrogen or, preferably, by the Leuckart reaction.

The pharmaceutically acceptable, relatively non-toxic acid addition salts may be formed from said cyclopentylbenzylamine derivatives in accordance with conventional practice, by using appropriate pharmaceutically acceptable inorganic and organic acids, such as hydrohalic acids, especially hydrochloric and hydrobromic acids, sulfuric, ethanesulfonic and phosphoric acids as well as acetic, aminoacetic, lactic, succinic, malic, aconitic, citric, phthalic, tartaric, benzoic acids, etc.

The pharmaceutically acceptable quaternary ammonium salts of the subject cyclopentylbenzylamine derivatives can be obtained by addition to the corresponding free bases of alkyl or aralkyl esters of inorganic sulfonic acids, including such compounds as methyl chloride, methyl bromide, methyl iodide, ethyl bromide, propyl bromide, octyl bromide, benzyl chloride, benzyl bromide, methyl sulfate, methyl benzenesulfonate, and methyl p-toluenesulfonate, giving the methochloride, methobromide, methoiodide, ethobromide, propobromide, octobromide, benzochloride, benzobromide, methosulfate, methobenzenesulfonate, and metho-p-toluene sulfonate salts, respectively.

The methods for the preparation of these compounds can be exemplified more fully by the following illustrative examples. The temperatures therein are given in degrees centigrade.

EXAMPLE I m-chloro-α-cyclopentyl-N,N-dimethylbenzylamine and salts thereof (A) m-chloro-α-cyclopentylbenzyl alcohol.—The Grignard reagent of 1-bromo-3-chlorobenzene was prepared by reacting 32 g. (0.167 mole) in ether with 4 g. (0.167 mole) of magnesium turnings. Cyclohexene oxide, 16 g. (0.163 mole) was added dropwise and with stirring to the cooled Grignard reagent. Dry benzene, 200 ml., was then added and ether distilled away until top temperature reached 75°. The benzene solution was refluxed for 2 hours, then cooled, and acidified with dilute, cold sulfuric acid. The organic layer was separated, washed with water, dried over anhydrous magnesium sulfate and distilled to obtain 23 g. (64%) of the desired alcohol; b.p. 120–130° (0.6 mm.).

(B) m-chlorophenylcyclopentyl ketone.—Potassium dichromate, 20.6 g., and 18 g. of sulfuric acid were dissolved in 100 ml. of water. This solution was stirred at about 30° and 21 g. (0.10 mole) of p-chloro-α-cyclopentylbenzyl alcohol added dropwise over a 20 minute period. The temperature rose to 55° and then commenced to fall. Stirring was continued for 20 minutes after reaching the maximum temperature. The reaction mixture was extracted twice with ether and the ether solution was washed, dried with magnesium sulfate and distilled. The pale-yellow product weight 17.4 g. (87%); B.P. 120–128° (0.6 mm.).

(C) m-Chloro-α-cyclopentylbenzylamine.—A mixture of 17.4 g. (.083 mole) of m-chlorophenylcyclopentyl ketone, 20 ml. (0.52 mole) of formic acid and 60 ml. (1.42 mole) of formamide was refluxed for 20 hours. The mixture was cooled somewhat, 100 ml. of acetic acid and 110 ml. of concentrated hydrochloric acid were added and refluxing was continued for 6 hours. The mixture was extracted with benzene and then rendered alkaline with sodium hydroxide solution. The amine was extracted with ether, washed, dried and distilled. A total of 10 g. (57%) of the desired amine was obtained; B.P. 120–130° (0.8 mm.).

*Analysis.*—For $C_{12}H_{16}ClN$. Calcd.: N, 6.68; Neut. Equiv., 210. Found: N, 6.38; Neut. Equiv., 221.

(D) m-Chloro-α-cyclopentyl - N,N - dimethylbenzylamine.—The amine obtained under C above was methylated by refluxing 9.8 g. (0.041 mole) with 12 ml. (0.12 mole) of 37% aqueous formaldehyde and 20 ml. (0.40 mole) of formic acid for 16 hours. After cooling, the reaction mixture was poured into water and extracted with ether. The aqueous solution was rendered alkaline and the liberated amine extracted with ether, washed, dried, and distilled. The water-white distillate weighed 7.7 g. (69%), B.P. 110–113° (0.4 mm.).

*Analysis.*—For $C_{14}H_{20}ClN$. Calcd.: N, 5.89. Found: N, 5.86.

(E) m-Chloro-α-cyclopentyl-N,N-dimethylbenzylamine hydrochloride.—The hydrochloride salt of the amine obtained under D above was prepared in ether from 6 g. (0.025 mole) of the base. After recrystallization from isopropanol-ether, a total of 5.7 g. (82%) of white needles, M.P. 210–211° was obtained.

*Analysis.*—For $C_{14}H_{20}ClN \cdot HCl$. Calcd.: Cl, 12.93. Found: Cl, 12.94.

(F) m-Chloro-α-cyclopentyl-N,N-dimethylbenzylamine methobromide.—This compound was obtained by heating a solution of 1.7 g. (0.007 mole) of m-chloro-α-cyclopentyl-N,N-dimethylbenzylamine and 2 g. (0.02 mole) of methyl bromide in dimethylformamide at 100° for 2 hours. The product was precipitated with ether and recrystallized from isopropyl alcohol and ether. One and six-tenths grams (67%) of methobromide as white crystals, M.P. 196–197°, were obtained.

*Aanalysis.*—For $C_{14}H_{20}ClN \cdot CH_3Br$. Calcd.: N, 4.21; Br, 24.02. Found: N, 4.28; Br, 23.52.

EXAMPLE II p-Chloro-α-cyclopentyl-N,N-dimethylbenzylamine and hydrochloride (A) p-Chloro-α-cyclopentylbenzyl alcohol.—This compound was prepared in the same manner as the meta chloro derivative described in Example I(A). In a typical preparation, 36.7 g. (68%) of alcohol, B.P. 125–132° (0.6 mm.), was obtained from 48 g. of 1-bromo-4-chlorobenzene.

(B) p-Chlorophenylcyclopentyl ketone.—This intermediate was made in the same manner as the meta chloro analog of Example I(B). In one experiment, 10.5 g. (.05 mole) of the alcohol was oxidized to give 6.2 g. (60%) of ketone; B.P. 136–144° (3–5 mm.).

(C) p-Chloro - α-cyclopentylbenzylamine.—A mixture of 21 g. of p-chlorophenylcyclopentyl ketone (0.1 mole), 20 ml. (0.52 mole) of formic acid and 60 ml. (1.42 mole) of formamide was refluxed for 24 hours. Concentrated hydrochloric acid (200 ml.) was added and refluxing was continued for 20 hours. The cooled mixture was made alkaline, the amine was extracted with ether and distilled to give 13.4 g. (64%) of amine boiling at 116–120° (0.5 mm.).

*Analysis.*—For $C_{12}H_{16}ClN$. Calcd.: N, 6.68. Found: N, 6.70.

(D) p-Chloro - α - cyclopentyl - N,N - dimethylbenzylamine.—The above amine was methylated by refluxing for 22 hours 11.2 g. (0.053 mole) thereof with 12 ml. (0.15 mole) of 37% aqueous formaldehyde and 20 ml. (0.40 mole) of formic acid. The excess reagents were stripped under vacuum and the residue poured into water. The aqueous solution was extracted with ether and then rendered alkaline with sodium hydroxide. The liberated amine was washed, dried and distilled to give 9.1 g. (73%) of the desired amine; B.P. 115–119° (0.5 mm.).

*Analysis.*—For $C_{14}H_{20}ClN$. Calcd.: N, 5.89; Neut. Equiv., 238. Found: N, 5.97; Neut. Equiv., 249.

(E) p-Chloro-α-cyclopentyl-N,N-dimethylbenzylamine hydrochloride.—The hydrochloride salt was prepared in ether from 6 g. (0.025 mole) of the base (D above). After recrystallization from isopropanol and ether a total of 5.1 g. (74%) of hydrochloride as white crystals, M.P. 190–192°, was obtained

*Analysis.*—For $C_{14}H_{20}ClN \cdot HCl$. Calcd.: N, 5.11; Cl, 12.93. Found: N, 5.12; Cl, 12.89.

EXAMPLE III p-Bromo-α-cyclopentylbenzylamine and hydrochloride (A) p-Bromo - α - cyclopentylbenzyl alcohol.—This preparation was carried out in the manner described in Example II. From 60 g. (0.25 mole) of dibromobenzene was obtained 29.0 g. of an alcohol boiling over a wide range. After careful redistillation the main bulk was collected between 140° and 148° (0.8 mm.), yield approximately 45.5%.

(B) p-Bromophenylcyclopentyl ketone.—The alcohol of A above was oxidized in the manner described above in Example I(B). From 28 g. (0.11 mole) of p-bromo-α-cyclopentylbenzyl alcohol was obtained a product that boiled over a wide range and appeared to contain free iodine. The material was dissolved in a little ether and shaken with metallic mercury before being redistilled to give 15.0 g. (54%); B.P. 122–130° (0.5 mm.).

(C) p-Bromo-α-cyclopentylbenzylamine.—This amine was prepared in the same manner as the para chloro compound of Example I(C). From 14.0 g. (0.054 mole) of the above ketone, 10.6 g. (83%) of the desired amine, B.P. 120–125° (0.3 mm.), was obtained.

*Analysis.*—For $C_{12}H_{16}BrN$. Calcd.: Neut. Equiv. 254. Found: Neut. Equiv. 261

(D) p-Bromo-α-cyclopentyl - N,N - dimethylbenzylamine.—Using the general alkylation method of the previous examples the title compound can be prepared.

It is possible to prepare the o-chloro substituted, the o- and m-bromo substituted cyclopentylbenzylamines, as well as other N,N-di(lower)alkyl (e.g., N, N-diethyl, N,N-dipropyl, N,N-dibutyl, etc.) substituted cyclopentylbenzylamines in an analogous manner as is readily obvious to a man skilled in the art.

As mentioned above, the compounds described herein can be employed to produce an anorexigenic effect. Particularly preferred among the compounds circumscribed by the above formula are m-chloro-α- cyclopentyl-N,N-dimethylbenzylamine (compound A hereinafter) and p-chloro-α-cyclopentyl - N,N-dimethylbenzylamine (compound B hereinafter) and salts thereof, and the inventive compositions and process will be illustrated by reference to these preferred embodiments.

Toxicity studies have shown that the compounds useful in practicing this invention are relatively non-toxic and therefore compatible with their intended use as anorexigenic agents. For example, compound A has an $LD_{50}$ I.V. in mice of 41 mg./kg. and its $LD_{50}$ I.P. in mice is 65 mg./kg. Toxicity data for compound B are as follows:

| | | | |
|---|---|---|---|
| $LD_{50}$ within 48 hours in mice: | | | |
| $CF_1$ male | mg./kg. | I.P. | 105 |
| $CF_1$ male | mg./kg. | P.O. | 230 |
| $LD_{50}$ within 24 hours in rats: | | | |
| Wistar male | mg./kg. | I.P. | 95 |
| Wistar male | mg./kg. | P.O. | 185 |

Further, the hydrochloride of compound B was studied in rats for its anorexigenic effects during a 58-day feeding period.

Male littermate rats, CD (Charles River) strain, were selected at an average body weight of 71–80 grams and were divided into five comparable groups of seven animals each with the exception of the Control group of twelve rats. The animals were individually caged in an air-conditioned room. Group A (Control) was fed and libitum a basal food stock ration in ground form (Purina Lab. Chow). The remaining groups were fed ad libitum this basal ground diet with the hydrochloride of the above compound incorporated therein or they were given the hydrochloride of the above compound in solution by stomach tube daily late in the afternoon. Body weights, food consumption and water intake were recorded throughout the period of experimentation.

Table I presents the data and results obtained. As can be seen therefrom, the anorexigenic effect in rats was more evident when the test compound was administered incorporated in the diet. When the test compound was administered in solution P.O. and the dosage was increased from 50 to 100 mg./kg. body weight, a marked difference was noted between the group receiving the test compound and the Control group: the former group gained only 20 grams versus 37 grams gained by the controls in the last 10 days of treatment.

TABLE I.—BODY WEIGHTS OF RATS TREATED WITH THE HYDROCHLORIDE OF COMPOUND B

| | Average weight in grams | | | | | | | | | | | | | |
|---|---|---|---|---|---|---|---|---|---|---|---|---|---|---|
| | 50 mg./kg. b.w. 500 mg./kg. diet | | | | | Drugs discontinued | | 50 mg./kg. b.w. 500 mg./kg. diet | | | 100 mg./kg. b.w. 1,000 mg./kg. diet | | | Actual body gain in grams |
| Experimental days | 0 | 4 | 9 | 13 | 17 | 22 | 30 | 33 | 37 | 41 | 48 | 55 | 58 | |
| Group: | | | | | | | | | | | | | | |
| Control | 75 | 93 | 122 | 149 | 181 | 204 | 260 | 276 | 299 | 322 | 350 | 378 | 387 | 312 |
| Hydrochloride of Compound B in solution P.O | 75 | 94 | 128 | 151 | 178 | 205 | 265 | 272 | 292 | 320 | 346 | 357 | 366 | 291 |
| Hydrochloride of compound B in food | 71 | 87 | 113 | 136 | 162 | 170 | 247 | 253 | 270 | 295 | 349 | 329 | 335 | 264 |

In the same series daily food consumption was lowered in the rats treated with the hydrochloride of compound B: 16.5 grams/rat/diem when giving the test compound in the food and 17 grams/rat/diem when giving the test compound in solution P.O. against 18.1 grams for the control group. In addition, the animals treated with the above compound needed more food in order to gain one gram in body weight: 3.41 (solution P.O.) and 3.63 (in food) grams against 3.34 grams for the controls. Water intake did not significantly differ from group to group throughout the entire test period. These results are shown in Table II.

TABLE II

| Group | Dose, mg./kg. b.w. | Route of administration | Average daily food intake per rat (gms.) | Food conversion | Average daily water intake per rat (cc.) |
|---|---|---|---|---|---|
| Control | | | 18.1 | 3.34 | 28.2 |
| Hydrochloride of compound B. | 50 | In solution P.O. | 17.0 | 3.41 | 26.7 |
| Do | 50 | In food | 16.5 | 3.63 | 23.3 |

The hematologic findings showed no significant differences at the end or after withdrawal of the test compound. In brief, no untoward effect was noted. Gross pathologic findings were within "normality" in all groups. Thus, as is obvious from the above data, it was determined that the hydrochloride of compound B exhibited anorexigenic activity and that it had no toxic effects when given P.O. daily in doses up to 100 mg./kg. b.w. for a period of 58 days.

In another anorexigenic study, four groups of five RH male rats, one group being the control group, were utilized. All animals were conditioned over a period of time to consume their food within seven hours each day. In a five-day test period, the averages of food consumption for three consecutive days (pre-treatment) were recorded. For two days (treatment) immediately following the pre-treatment the animals were given the hydrochloride of compounds A and B in solution P.O. once daily, with food consumption for all groups being recorded seven hours after administration of the test compounds. The test results are summarized in Table III.

TABLE III

| Test compound | Dose, mg./kg. | Food eaten in gms. daily: Pre-treatment | Food eaten in gms. daily: Treatment | Percent (+) increase (−) decrease |
|---|---|---|---|---|
| Control | | 18.3 | 19.9 | +8.7 |
| Hydrochloride of compound A | 50 | 17.4 | 14.5 | −16.7 |
| Hydrochloride of compound B | 50 | 16.9 | 10.5 | −37.9 |
| Do | 25 | 18.8 | 16.2 | −13.8 |

In still another anorexigenic study with a group of eight rats, it was found that the DE 50 (50% decrease in food intake) of compound A is 13 mg./kg. I.P. and 33 mg./kg. P.O. and that of compound B, 19 mg./kg. I.P. and 40 mg./kg. P.O.

According to this invention new therapeutic compositions are provided which are adapted to the treatment of conditions of obesity and which comprise a cyclopentylbenzylamine derivative as defined above as active anorexic ingredient and pharmaceutical excipients or carriers known for the production of formulations suitable for oral or parenteral administration.

Compositions suitable for oral administration are the known pharmaceutical forms for such administration, as for example, tablets, capsules, pills, syrups, elixirs and aqueous or oily suspensions and the excipients used in the production of these formulations are the excipients well known to the pharmacist's art, as are also the means of formulation.

Particularly suitable compositions may be tablets wherein the cyclopentylbenzylamine is mixed with an inert diluent, as for example, calcium sulfate or carbonate, lactose, etc. Disintegrating agents, such as starch and lubricating agents, such as magnesium stearate, are also advantageously added.

In preparing a tablet, it is first necessary to make up a base granulation containing the active ingredient in the form of a uniformly fine powder and powdered sucrose, powdered lactose, powdered starch, powdered calcium sulfate or carbonate or combinations of such substances. If desired, a color may be incorporated at the same time by dissolving it in a portion of the granulating solution or as a dry impalpable powder before moistening with gelatin, acacia, etc.

The uniformly dampened material is then screened coarsely (No. 4 to 12 mesh, depending on the properties of the dampened mass), spread on trays in thin layers, and dried. When dry, the mass is further sieved through a No. 16 or No. 20 mesh screen.

A lubricating agent, such as calcium or magnesium stearate, and a disintegrating agent as, for example, dried powdered starch are then mixed. After the mixture has been completed, it is then added to the base granulation, as previously described, and the mixed material is then compressed in tablet form.

A typical formulation for tablets is as follows:

EXAMPLE IV

| | Mg. |
|---|---|
| Compound of Example I HCl | 25 |
| Lactose | 68 |
| Talc | 75 |
| Starch | 87 |
| Colored starch | 26 |
| Gelatin | 3 |
| Stearic acid | 3 |

It is contemplated that the anorexic agents of this invention may also be used in the form of coated or compressed and coated tablets in addition to compressed tablets.

Aqueous suspensions for oral use may contain cyclopentylbenzylamine in aqueous media in the presence of a suitable non-toxic suspending agent, such as sodium carboxymethylcellulose and suitable dispersing agents. Suitable dispersing agents may be, for example, lecithin or condensation products of ethylene oxide with fatty acids, as for example, polyoxyethylene stearate or with fatty alcohols, as for example, heptadeca-ethyleneoxycetanol or with partial esters derived from the fatty acids and hexitols, for example, polyoxyethylene sorbitol hexaoleate, or with partial esters derived from the fatty acids and hexitol anhydrides, for example, hexitans derived from sorbitol, such as polyoxyethylene sorbitan monooleate. Oily suspensions or emulsions for oral use may be formulated in a suitable vegetable oil, for example, arachis oil which may contain suitable sweetening agents and preservatives.

Compositions suitable for parenteral administration are the known pharmaceutical forms for such administration, for example, sterile dispersion in aqueous and oily media. The excipients used in these formulations are the excipients well known to the pharmacist's art, as are also the means of formulation.

The sterile aqueous dispersion for parenteral administration may be formulated in the presence of parenterally-acceptable suspending agents and dispersing agents. Suitable suspending agents may be, for example, sodium carboxymethylcellulose, sodium alginate or polyvinyl pyrrolidone and suitable dispersing agents may be lecithin or the ethylene oxide condensation products described above for use as dispersing agents in the preparation of oral aqueous suspensions. Suitable injectable oily preparations may be prepared by dispersing cyclopentylbenzylamine in an oily medium, for example, a vegetable oil, such as arachis oil which is known to be nontoxic and parenterally-acceptable.

A typical formulation for a parenteral composition is as follows:

EXAMPLE V

| | | |
|---|---|---|
| Compound of Example II HCl | mg | 25.00 |
| Sodium citrate | mg | 3.60 |
| Citric acid | mg | 0.75 |
| Water (demineralized, deionized) | cc | 1.00 |

What is claimed is:

1. A process for obtaining an anorexigenic effect in mammals which comprises administering internally to mammals for their weight or appetite control a member selected from the group consisting of a compound of the formula

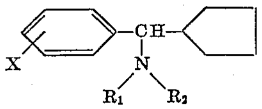

wherein $R_1$ and $R_2$ are lower alkyl and X is a member of the group consisting of chlorine and bromine and non-toxic water-soluble acid addition and quaternary ammonium salts thereof, in an amount ranging from about 25 to 300 milligrams of said compound.

2. A process for obtaining an anorexigenic effect in mammals which comprises administreing internally to mammals for their weight or appetite control a compound of the group consisting of m-chloro-α-cyclopentyl-N,N-dimethylbenzylamine and non-toxic water-soluble acid addition and quaternary ammonium salts thereof, in an amount ranging from about 25 to 300 milligrams of said member.

3. A process for obtaining an anorexigenic effect in mammals which comprises administering internally to mammals for their weight or appetite control a compound of the group consisting of p-chloro-α-cyclopentyl-N,N-dimethylbenzylamine and non-toxic water-soluble acid addition and quaternary ammonium salts thereof, in an amount ranging from about 25 to 300 milligrams of said compound.

References Cited

UNITED STATES PATENTS 3,320,252 5/1967 Doebel et al. ________ 260—247

ALBERT T. MYERS, *Primary Examiner.*

S. J. FRIEDMAN, *Assistant Examiner.*

U.S. Cl. X.R.

424—330